UNITED STATES PATENT OFFICE.

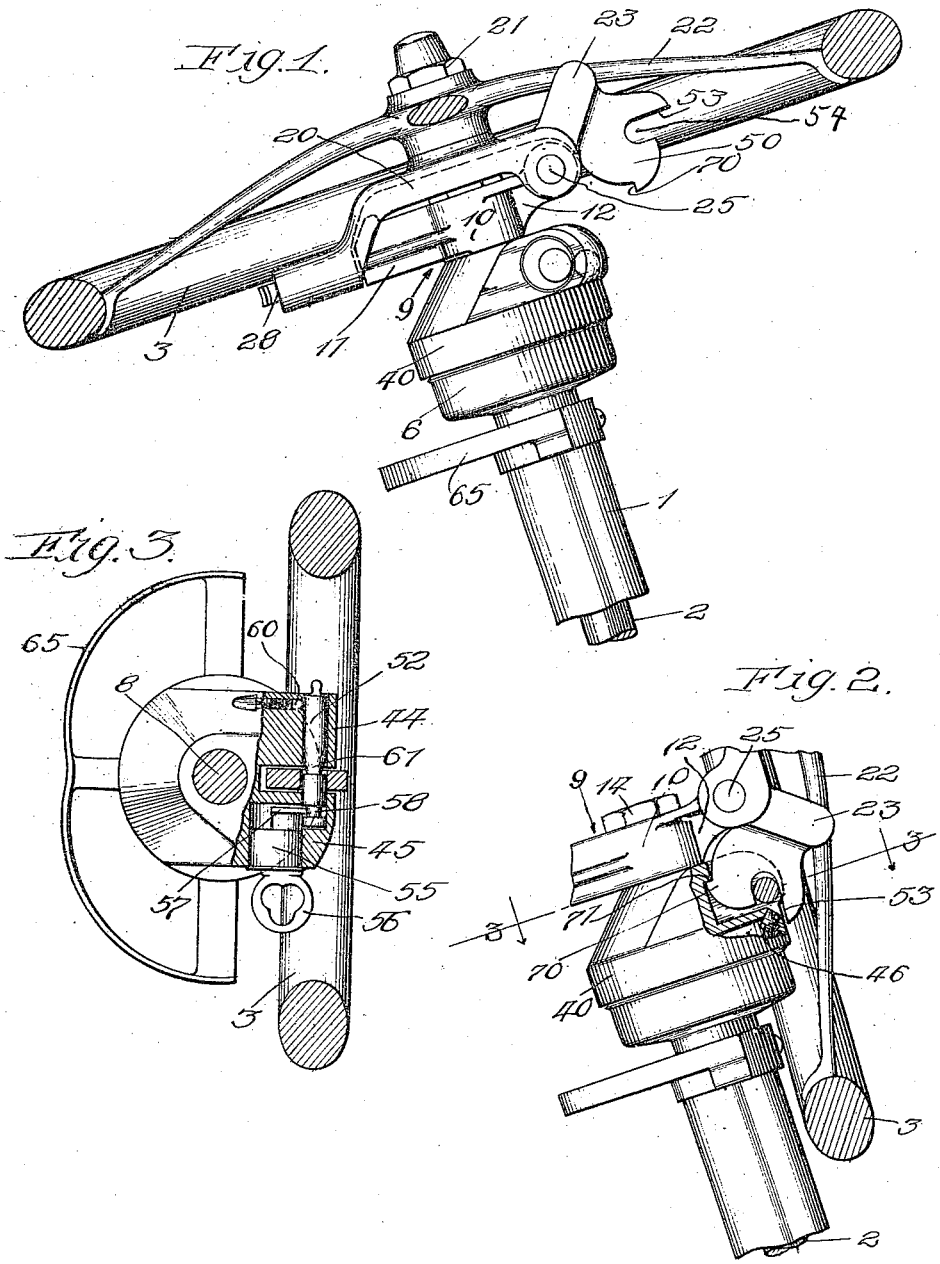

RICHARD C. STONE, OF MUNCIE, INDIANA.

STEERING DEVICE FOR AUTOMOBILES.

1,298,263.  Specification of Letters Patent.  Patented Mar. 25, 1919.

Application filed December 3, 1917. Serial No. 205,200.

*To all whom it may concern:*

Be it known that I, RICHARD C. STONE, a citizen of the United States, residing in Muncie, county of Delaware, and State of Indiana, have invented new and useful Improvements in Steering Devices for Automobiles, of which the following is a specification.

This invention relates to improvements in steering devices for automobiles, and more especially to an improved device for use in connection with the other parts of a steering gear of well known form, whereby greater convenience of access to the driver's seat may be afforded, and whereby also the steering gear may be rendered inoperative to prevent unauthorized use of the vehicle. Accordingly, the particular embodiment of the invention herein shown is in the nature of an attachment adapted for interposition between the steering wheel and the steering column on which it is ordinarily mounted; such attachment including two parts which are hinged together to permit of tilting the wheel out of its normal plane when it is desired to enter or leave the driver's position, and means for locking the wheel in its inoperative position to prevent the vehicle from being effectively driven away. The device is illustrated in the accompanying drawings, in which:

Figure 1 is a view in side elevation, showing the complete device in use in connection with a steering gear.

Fig. 2 is a similar view, with parts broken away, showing the steering wheel in its tilted position.

Fig. 3 is a radial section on the line 3—3 of Fig. 2.

As shown in said drawings, the complete steering gear includes a fixed tubular column or post 1, in which is journaled a shaft 2 for controlling the steering movements of the vehicle through a hand wheel 3, these parts being here shown in well known form as they are actually used on vehicles. The upper end of the column 1 is provided with a cylindric gear housing 6, in which are arranged a set of gears for transmitting a reduced movement of the wheel 3 to the shaft 2; the wheel being ordinarily fixed to the upper end of a short shaft or spindle, 8, extending into the gear housing, and the latter being provided with a threaded and removable cover, not here shown.

In practising my invention, the steering wheel 3 is removed from the shaft 8, and in its place is secured a part 9 which is made with a hub portion 10, and a pair of oppositely extending radial projections, 11 and 12 respectively. The hub 10 is made with an opening through it corresponding exactly with the opening in the hub of the wheel, so that it may be keyed against rotation and fixed in place by a nut 14 on the projecting threaded end of the shaft, in the same manner as the wheel was originally secured in place. To the part 9 there is hinged a movable part 20, which is made with a pair of radial extensions corresponding to the general position of the parts 11 and 12, and with a short spindle to carry the wheel 3; and the latter is secured on the spindle by a nut 21 and prevented from rotating thereon by the engagement of a spoke 22 in a notch in the upper surface of a part 23 projecting upward from one of the radial extensions. The two parts or members 9 and 20 are hinged together by a pin 25, connecting the arm 12 with the corresponding end of the movable member, so that by a movement of the hinge joint, the wheel may be tilted from its normal position, shown in Fig. 1, into that shown in Fig. 2; and in its normal position it is automatically latched against accidental displacement by a spring pressed latch bolt 28 which extends radially through an opening in the end of the part 20 opposite to the hinge joint, and enters a depression in the adjacent end of the arm 11. The cover of the gear housing 6 is also removed and replaced by a cover 40, which may be made exactly like the original cover in all respects, except that there is formed integrally on one side a tangential projection which is separated by a slot cut through it into two parts, 44 and 45 respectively. When the cover is fitted into place it is turned until the projections 44 and 45 are below the hinge joint 25, where it may be secured by a set screw 46. The hinged member 20 is also made with an integral flange 50, which, in the tilting movement of the wheel, enters the slot between the two projections 44 and 45 of the cover 40, and may be locked therein. For this purpose a locking bolt 52 is arranged to slide horizontally in an opening through the part 44 to engage a notch 54 in the flange 50, and enter a corresponding opening in the part 45; where it may be locked by a lock 55 of any approved form, controlled by a removable key 56, and having a part 57 to enter a groove 58 at the end of the bolt 52, and prevent it from sliding endwise. In its withdrawn position the bolt 52 is yieldingly held by a spring pressed detent pin 60 entering another groove 61 in the bolt, so that the wheel may be tilted; and the wheel being in its tilted position, it may be latched by pushing the bolt 52 through the notch 54 and locked by turning the key to engage the end of the bolt with the lock. The upper side of the notch 54 in the flange 50 is extended to form the lip 53. When the wheel is in its tilted position this lip 53 covers the set screw 46 and prevents access thereto and removal of the same. In addition the flange 50 is made with a projection 70 extending outward at right angles to the depth of the notch 54 and adapted to engage under a shoulder 71 in the part 40 when the wheel is in its tilted position; so that the locked parts can not be disengaged by loosening either the nut 14 or 21; nor can the shaft 8 be rotated without turning the cover 40, which is prevented by the set screw 46.

Although I have here shown the wheel tilting upward it is obvious that it may be installed to tilt downward or to either side. This is accomplished by turning the cover 40 to the desired position before it is fastened by the set screw 46. For example, if it is desired to tilt the wheel downward the cover is turned until the projections 44 and 45 are to the rear or next to the driver of the car.

The parts of an actual vehicle here shown also include a pair of stationary segments 65, for the control levers, which are fixed to the upper end of the column 1, so that when the wheel is in its tilted position, if it is so installed as to tilt downward, the interference with it of these levers will prevent their proper placement for starting the motor and thus furnish an additional means of preventing the vehicle from being stolen.

I claim as my invention:

1. In a steering gear, the combination with a steering post having a stationary part at its upper end, a shaft projecting above it, and a steering wheel having an opening in its hub adapted to fit on the end of the shaft, of a member made in two parts, hinged together, and interposed between the end of the shaft and the wheel, one part having an opening corresponding to the opening in the hub of the wheel and fitting on the end of the shaft and the other part being movable with respect thereto, and having a portion engaging in the opening in the hub of the wheel and a flange with a notch and a projection extending outward at right angles to the depth of the notch, said flange adapted to enter a slot between two projections on the stationary part at the upper end of the steering post, the projection on said flange engaging under a shoulder, and means for locking said flange in said slot consisting of a sliding bolt adapted to enter the notch in said flange, whereby the wheel is retained in a displaced position and secured against removal.

2. In a steering gear, the combination with a steering post having a stationary part at its upper end fastened by a set screw, a shaft projecting above it, and a steering wheel having an opening in its hub adapted to fit on the end of the shaft, of a member made in two parts, hinged together, and interposed between the end of the shaft and the wheel, one part having an opening corresponding to the opening in the hub of the wheel and fitting on the end of the shaft and the other part being movable with respect thereto, and having a portion engaging in the opening in the hub of the wheel and a flange with a notch, the upper side extended to form a lip, and a projection extending outward at right angles to the depth of the notch, said flange adapted to enter a slot between two projections on the stationary part at the upper end of the steering post, the projection on said flange engaging under a shoulder, and the lip covering the set screw, and means for locking said flange in said slot consisting of a sliding bolt adapted to enter the notch in said flange, whereby the wheel is retained in a displaced position and secured against removal.

In witness whereof, I have hereunto subscribed my name this 12 day of November, 1917.

RICHARD C. STONE.